(12) United States Patent
Gleason

(10) Patent No.: US 7,308,374 B2
(45) Date of Patent: Dec. 11, 2007

(54) METHOD FOR SITING DETECTORS WITHIN A FACILITY

(75) Inventor: Nathaniel Jeremy Meyer Gleason, Livermore, CA (US)

(73) Assignee: Sandia National Laboratories, Livermore, CA (US)

(*) Notice: Subject to any disclaimer, the term of this patent is extended or adjusted under 35 U.S.C. 154(b) by 256 days.

(21) Appl. No.: 11/136,077

(22) Filed: May 24, 2005

(65) Prior Publication Data

US 2006/0271211 A1 Nov. 30, 2006

(51) Int. Cl.
*G06F 19/00* (2006.01)
(52) U.S. Cl. .................. 702/100; 702/45; 702/94; 702/100; 702/104
(58) Field of Classification Search ............ 702/94–95, 702/45, 100, 104; 324/149, 611; 340/606, 340/620; 700/73, 19, 39; 73/40.5 R
See application file for complete search history.

(56) References Cited

U.S. PATENT DOCUMENTS

| | | | | |
|---|---|---|---|---|
| 3,975,943 | A | * 8/1976 | Brachet | 73/40 |
| 4,668,943 | A | * 5/1987 | Bunker et al. | 340/606 |
| 6,456,379 | B1 | * 9/2002 | Kunz et al. | 356/435 |
| 6,480,282 | B1 | * 11/2002 | Chinowsky et al. | 356/445 |
| 6,687,640 | B1 | 2/2004 | Gelbard | 702/122 |
| 2005/0002662 | A1 | 1/2005 | Arpa et al. | 396/120 |

OTHER PUBLICATIONS

Doviak et al., 'Siting of Doppler Weather Radars to Shield Ground Targets', Jul. 1985, IEEE Publication, vol. AP-33, No. 7, pp. 685-689.*
Gharib et al., 'Optical Microprocessors for Fluid Flow Diagnostics', 2001, AIAA Pulbication, pp. 1-6.*
Wang et al., 'Optical Flow Sensing for Flare Stack and Process Control Applications', 2004, ISA Publication, pp. 1-13.*

(Continued)

*Primary Examiner*—Eliseo Ramos-Feliciano
*Assistant Examiner*—Elias Desta
(74) *Attorney, Agent, or Firm*—Michaelson & Associates; Peter L. Michaelson; George Wolken, Jr.

(57) ABSTRACT

A method, system and article of manufacture of siting one or more detectors in a facility represented with zones are provided. Signals $S_{i,j}$ representing an effect in zone j in response to a release of contaminant in zone i for one or more flow conditions are provided. A candidate architecture has one or more candidate zones. A limiting case signal is determined for each flow condition for multiple candidate architectures. The limiting case signal is a smallest system signal of multiple system signals associated with a release in a zone. Each system signal is a maximum one of the signals representing the effect in the candidate zones from the release in one zone for the flow condition. For each candidate architecture, a robust limiting case signal is determined based on a minimum of the limiting case signals. One candidate architecture is selected based on the robust limiting case signals.

21 Claims, 11 Drawing Sheets

OTHER PUBLICATIONS

Berger-Wolf et al, "Discrete Sensor Placement Problems in Distribution Networks", submitted to Elsevier Science, Dec. 15, 2004, pp. 1-30. Attached copy downloaded from http://www.cs.unm.edu/-saia/papers/sensors.pdf on May 27, 2005.

Dois et al, "NISTIR 6921: CONTAMW 2.0 User Manual: Multizone Airflow and Contaminant Transport Analysis Software", National Institute of Standards and Technology, Technology Administration, U.S. Department of Commerce, Nov. 2002, pp. cover 157. Attached copy downloaded from http://www.bfrl.nist.gov/IAQanalysis/docs/NISTIR6921.pdf on Apr. 12, 2005.

Gelbard et al, "An Algorithm for Locating Sensors in a Large Multi-Room Building", Sandia National Laboratories, SAND2000-0851, printed May 2000, pp. cover-29.

Gelbard et al, "Sensor Analysis Software (SAS): An Algorithm for Determining Airborne Agent Concentrations Throughout a Large Multi-Room Building", Sandia National Laboratories, SAND99-1945, printed Aug. 1999, pp. cover-28.

Walton et al, "NISTIR 7049: CONTAM 2.1 Supplemental User Guide and Program Documentation", National Institute of Standards and Technology, Technology Administration, U.S. Department of Commerce, Oct. 23, 2003, pp. cover 97. Attached copy downloaded from http://www.bfrl.nist.gov/IAQanalysis/docs/NISTIR_7049.pdf on Apr. 13, 2005.

* cited by examiner

```
                    ┌───┐
                    │ A │
                    └─┬─┘
                      ▼
                   ╱─────╲         ─70
                  ╱ More   ╲   Yes
                 ╱ candidate ╲─────────────┐
                 ╲ architectures╱          │         ─72
                  ╲to evaluate?╱           ▼
                   ╲─────────╱   ┌──────────────────────────────┐
                       │ No      │ Get next candidate architecture. │
                       │         └──────────────┬───────────────┘
                       │                        ▼
                       │                      ┌───┐
                       │                      │ B │
                       │                      └───┘
                       ▼
```

| | ─74 |
|---|---|
| Select the candidate architecture associated with a maximum robust limiting case signal. | |

| | ─76 |
|---|---|
| Scale the predetermined concentration of contaminant released by the ratio of the maximum robust limiting case signal to the unit detection threshold of the detector. | |

|  | Possible Detector Locations | | | | |
|---|---|---|---|---|---|
|  | Zone A | Zone B | Zone C | Zone D | Zone E |
| Zone A | 151 x 10⁶ | 2 x 10⁶ | 0.8 x 10⁶ | 17 x 10⁶ | 0 x 10⁶ |
| Zone B | 7 x 10⁶ | 123 x 10⁶ | 2 x 10⁶ | 0.5 x 10⁶ | 0 x 10⁶ |
| Zone C | 0.1 x 10⁶ | 0 x 10⁶ | 96 x 10⁶ | 62 x 10⁶ | 0.2 x 10⁶ |
| Zone D | 20 x 10⁶ | 31 x 10⁶ | 0.09 x 10⁶ | 238 x 10⁶ | 3 x 10⁶ |
| Zone E | 4 x 10⁶ | 0.001 x 10⁶ | 11 x 10⁶ | 0.3 x 10⁶ | 15 x 10⁶ |

FIGURE 5

|  | Possible Detector Locations | |
|---|---|---|
|  | Zone A | Zone D |
| Zone A | 151 x 10⁶ | 17 x 10⁶ |
| Zone B | 7 x 10⁶ | 0.5 x 10⁶ |
| Zone C | 0.1 x 10⁶ | 62 x 10⁶ |
| Zone D | 20 x 10⁶ | 238 x 10⁶ |
| Zone E | 4 x 10⁶ | 0.3 x 10⁶ |

FIGURE 6

|  | System |
|---|---|
| Zone A | 151 x 10⁶ |
| Zone B | 7 x 10⁶ |
| Zone C | 62 x 10⁶ |
| Zone D | 238 x 10⁶ |
| Zone E | 4 x 10⁶ |

| 4 x 10⁶ |
|---|

110 ⟶

Flow Condition n: Possible Detector Locations

Flow Condition 2: Possible Detector Locations

Flow Condition 1: Possible Detector Locations

Possible Release Locations

|        | Zone A      | Zone B        | Zone C       | Zone D       | Zone E       |
|--------|-------------|---------------|--------------|--------------|--------------|
| Zone A | 151 x 10⁶   | 2 x 10⁶       | 0.8 x 10⁶    | 17 x 10⁶     | 0 x 10⁶      |
| Zone B | 7 x 10⁶     | 123 x 10⁶     | 2 x 10⁶      | 0.5 x 10⁶    | 0 x 10⁶      |
| Zone C | 0.1 x 10⁶   | 0 x 10⁶       | 96 x 10⁶     | 62 x 10⁶     | 0.2 x 10⁶    |
| Zone D | 20 x 10⁶    | 31 x 10⁶      | 0.09 x 10⁶   | 238 x 10⁶    | 3 x 10⁶      |
| Zone E | 4 x 10⁶     | 0.001 x 10⁶   | 11 x 10⁶     | 0.3 x 10⁶    | 15 x 10⁶     |

|        | Flow Condition 1 (122) | Flow Condition 2 (124) | Flow Condition 3 (126) | Flow Condition 4 (128) |
|--------|------------------------|------------------------|------------------------|------------------------|
| Zone A | 151 x 10⁶              | 142 x 10⁶              | 111 x 10⁶              | 159 x 10⁶              |
| Zone B | 7 x 10⁶                | 17 x 10⁶               | 5 x 10⁶                | 16 x 10⁶               |
| Zone C | 62 x 10⁶               | 32 x 10⁶               | 41 x 10⁶               | 8 x 10⁶                |
| Zone D | 238 x 10⁶              | 108 x 10⁶              | 175 x 10⁶              | 18 x 10⁶               |
| Zone E | 4 x 10⁶                | 57 x 10⁶               | 3 x 10⁶                | 207 x 10⁶              |
|        | ↓ 132                  | ↓ 134                  | ↓ 136                  | ↓ 138                  |
|        | 4 x 10⁶                | 17 x 10⁶               | 3 x 10⁶                | 8 x 10⁶                |

FIGURE 8

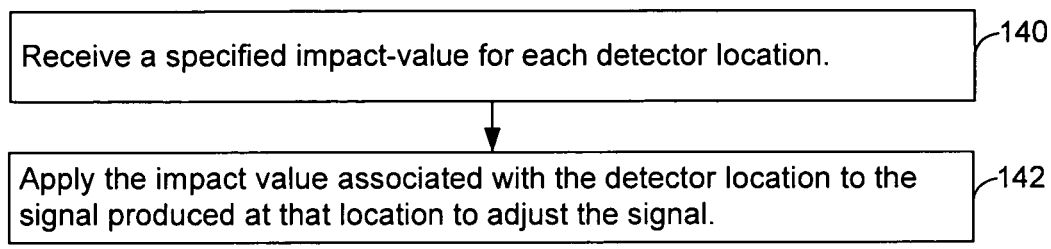

Receive a specified impact-value for each detector location. ⟶ 140

Apply the impact value associated with the detector location to the signal produced at that location to adjust the signal. ⟶ 142

FIGURE 9

| | Possible Detector Locations | | | | |
|---|---|---|---|---|---|
| | Zone A | Zone B | Zone C | Zone D | Zone E |
| Zone A | $1510 \times 10^6$ | $40 \times 10^6$ | $0.8 \times 10^6$ | $1700 \times 10^6$ | $0 \times 10^6$ |
| Zone B | $70 \times 10^6$ | $2460 \times 10^6$ | $2 \times 10^6$ | $50 \times 10^6$ | $0 \times 10^6$ |
| Zone C | $1 \times 10^6$ | $0 \times 10^6$ | $96 \times 10^6$ | $6200 \times 10^6$ | $6 \times 10^6$ |
| Zone D | $200 \times 10^6$ | $620 \times 10^6$ | $0.09 \times 10^6$ | $23800 \times 10^6$ | $90 \times 10^6$ |
| Zone E | $40 \times 10^6$ | $0.02 \times 10^6$ | $11 \times 10^6$ | $30 \times 10^6$ | $450 \times 10^6$ |

FIGURE 10

```
┌─────────────────────────────────────────────────────────────┐
│ Select a candidate architecture to evaluate.                │─170
└─────────────────────────────────────────────────────────────┘
                              │
                              ▼
┌─────────────────────────────────────────────────────────────┐
│ For each flow condition: for each possible release zone i:  │─172
│ identify a maximum concentration of contaminant received by │
│ any detector of the candidate architecture for a release of │
│ a predetermined concentration of contaminant from zone i.   │
└─────────────────────────────────────────────────────────────┘
                              │
                              ▼
┌─────────────────────────────────────────────────────────────┐
│ For each flow condition: for each possible release zone i:  │─174
│ scale the release size of zone i by the ratio of the unit   │
│ detection threshold to the maximum contaminant in zone j to │
│ provide a detectable release size from zone i.              │
└─────────────────────────────────────────────────────────────┘
                              │
                              ▼
┌─────────────────────────────────────────────────────────────┐
│ For each flow condition: for a plurality of time intervals: │─176
│ receive a table comprising a concentration of contaminant in│
│ each zone j for a release of the predetermined              │
│ concentration of contaminant from zone i.                   │
└─────────────────────────────────────────────────────────────┘
                              │
                              ▼
┌─────────────────────────────────────────────────────────────┐
│ Produce a table of signals representing an amount of        │─178
│ contaminant that persons in a zone are exposed to for each  │
│ flow condition:                                             │
│     For each flow condition: for each possible release of   │
│ contaminant from zone i and detector in zone j:             │
│         Sum the concentration of contaminant in zone j over │
│ a predetermined number of the time intervals and multiply   │
│ by the breathing rate of a person to provide an amount of   │
│ contaminant in a person's lungs;                            │
│         Scale the amount of contaminant in a person's lungs │
│ in zone j by the ratio of the detectable release size from  │
│ zone i to the predetermined concentration of contaminant    │
│ from zone i to provide a scaled contaminant amount for zone │
│ j;                                                          │
│         Determine the probability of infection for a person │
│ in zone j based on the scaled amount of contaminant for     │
│ zone j; and                                                 │
│         Multiply the probability of infection for zone j by │
│ the number of people in zone j to determine the number of   │
│ people infected.                                            │
└─────────────────────────────────────────────────────────────┘
```

FIGURE 12

METHOD FOR SITING DETECTORS WITHIN A FACILITY

STATEMENT REGARDING FEDERALLY SPONSORED RESEARCH OR DEVELOPMENT

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing on this invention to license others on reasonable terms.

BACKGROUND OF THE INVENTION

1. Field of Invention

This invention relates generally to the field of placing or siting detectors within a facility and, more particularly, to a method, system and article of manufacture to place one or more detectors in a facility with a view towards maximizing the detectability of contaminants released within the facility.

2. Description of the Prior Art

The malevolent release of biological, chemical or other hazardous materials inside a large, public facility is considered by many to be a serious threat. When released in the confines of a facility, even very small amounts of a biological, chemical or other hazardous agent (collectively referred to as "agent") can create a substantial risk.

Attacks using agents are likely to be covert. Therefore, in the absence of a detector system within the facility capable of sensing the agent, the first evidence of the attack may come days after the actual release when patients start flooding emergency rooms or other medical care providers. Early detection of agents allows effective treatment of pre-symptomatic exposed patients.

One aspect of protecting an airport, transportation node or other facility from malevolent release of an agent (or multiple agents) is the deployment of a detection system within the facility. An important aspect of the design and installation of such a detector system is to place or site the detectors or sensors at locations within the facility so as to effectively detect agents. Advantageously siting detectors for effective sensing of agents is one objective of the present invention.

Detectors can be expensive, and the cost of a detector system is typically directly related to the number of detectors in operation. Under such circumstances, there is a strong incentive to determine the smallest number of detectors that provides the desired detection capabilities within the facility. However, whether or not detector cost is a major concern in the design of a detector system, it is advantageous to select the locations for placing any finite number of detectors within a facility with a view towards maximizing (or improving) the detectability of agents released within the facility. This is another objective of the present invention.

Conventionally, when deploying a detector system in a facility including one, two or a very few detectors, the deployment location is typically based on a simple facility walkthrough and a subjective determination of detector siting. Using a walkthrough approach, it is possible that a detector will be placed at a location, site j, such that it will not be able to detect a release occurring at location i. In addition, employing this walkthrough approach may result in the number of detectors and the location of the detectors not providing the desired coverage or an acceptable level of coverage.

Typical techniques for siting detectors in facilities focus on maximizing the ability to calculate the source of a release from information obtained by detectors in the facility, for example, as described by F. Gelbard, J. E. Brockmann, and K. K. Murata in "Sensor Analysis Software (SAS): An Algorithm for Determining Airborne Agent Concentrations Throughout a Large Multi-Room Building". Technical Report SAND 99-1945, Sandia National Laboratories, Albuquerque N. Mex., August 1999, and by F. Gelbard, J. E. Brockmann, K. K. Murata, and W. E. Hart in "An Algorithm for Locating Sensors in a Large Multi-Room Building". Technical Report SAND 2000-0851, Sandia National Laboratories, Albuquerque N. Mex., May 2000. Dynamically placing visual sensors such as TV cameras to achieve visual coverage of a three-dimensional volume is described by Arpa et al US Patent Publication No. 2005/0002662.

However, a different situation is presented when, as here, it is desired to place detectors so as to detect a minimum or near minimum release of agent, in contrast with techniques focused on siting detectors so as to determine the source of release. When it is desired to identify the source of agent release, the available number of detectors may be placed in such a way that the resulting detector system will be unable to detect a release from all realistic release points, i. Hence, one objective of the present invention is to site detectors at locations j within a facility so as to achieve acceptable (ideally, optimal) detection of the smallest feasible release of agents at any feasible release location i within the facility. Thus, there is a need in the art for a technique to site detectors within a facility which considers the minimum agent released that the system is capable of detecting from all feasible release locations.

SUMMARY OF THE INVENTION

Accordingly and advantageously the present invention provides a method, system and article of manufacture to site one or more detectors in a facility represented with a plurality of zones, $m=1, 2, \ldots M$, and under a plurality of flow conditions, $n=1, 2, \ldots N$. Signals $S_{i,j}$ representing an effect in zone j in response to a release of contaminant in zone i for one or more flow conditions are provided. A candidate architecture has one or more candidate zones. A limiting case signal is determined for each flow condition for each candidate architecture of a plurality of candidate architectures. The limiting case signal is a smallest system signal of multiple system signals associated with a release in a zone. Each system signal is a maximum one of the signals representing the effect in the candidate zones from the release in one zone for the flow condition. For each candidate architecture, a robust limiting case signal is determined based on a minimum of the limiting case signals. One candidate architecture is selected based on the robust limiting case signals. In various embodiments, the selected candidate architecture is associated with the robust limiting case signal which has the highest value.

In some embodiments, the effect is a concentration of contaminant reaching a detector in zone j. In various embodiments, the amount of contaminant released is scaled by a ratio of the robust limiting case signal which has the highest value to a unit detection threshold of at least one of the detectors to provide a minimum concentration detected by the candidate architecture.

In this way, a technique is provided to site detectors which considers the minimum agent released that the system is capable of detecting.

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not to scale.

The techniques of the present invention can readily be understood by considering the following detailed description in conjunction with the accompanying drawings, in which:

FIG. 4 depicts an exemplary table of signals representing a total number of spores collected by a detector located in each zone which is a possible detector location given a one gram release of spores from each zone which is a possible release location for one flow condition.

FIG. 5 depicts an exemplary table of signals for the detector locations of a candidate architecture based on the table of FIG. 4.

FIG. 6 depicts an exemplary system table comprising system signals for the detector locations of the candidate architecture of FIG. 5.

FIG. 7 illustrates a set of n exemplary tables, one for each flow condition, each table containing a set of signals for that flow condition.

FIG. 8 depicts a set of exemplary system tables for four flow conditions, and the limiting system signal for each system table.

FIG. 9 depicts a flowchart of an embodiment of additional steps performed by the flowchart of FIG. 3 to select an architecture based on the impact of a release.

FIG. 10 depicts a table of signals which have been adjusted by their associated impact-values.

FIG. 12 depicts a flowchart of an embodiment of steps performed to provide a table of signals representing the number of people infected in a zone j for a predetermined release of contaminant from zone i.

DETAILED DESCRIPTION

After considering the following description, those skilled in the art will clearly realize that the teachings of the invention can be readily utilized to site detectors in a facility. A method, system and article of manufacture to site one or more detectors in a facility are provided.

In various embodiments, a facility is represented with a plurality of zones, m=1, 2, ... M, and under a plurality of flow conditions, n=1, 2, ... N. Signals $S_{i,j}$ representing an effect in zone j in response to a release of contaminant in zone i for one or more flow conditions are provided. A candidate architecture has one or more candidate zones. A limiting case signal is determined for each flow condition for each candidate architecture of a plurality of candidate architectures. The limiting case signal is a smallest system signal of multiple system signals associated with a release in a zone. Each system signal is a maximum one of the signals representing the effect in the candidate zones from the release in one zone for the flow condition. For each candidate architecture, a robust limiting case signal is determined based on a minimum of the limiting case signals. One candidate architecture is selected based on the robust limiting case signals.

In some embodiments, for a predetermined concentration of agent released at location i, a detector placed at location j generates a signal $S_{i,j}$ for each flow condition. Distinct candidate architectures having one or more detectors are identified. Each detector is placed in one of the M zones. The number of detectors is typically less than M, the number of zones. A robust limiting case signal is determined for each candidate architecture based on the signals produced under the flow conditions. The robust limiting case signal is a most difficult to detect signal by the one or more detectors of that candidate architecture under the most difficult to detect flow condition. Thus, for the various candidate architectures, a plurality of robust limiting case signals are provided. The desired candidate architecture is selected based on the robust limiting case signals.

In various embodiments, the concentration represents a quantity of contaminant or agent. For example, in some embodiments, the concentration represents the quantity of contaminant or agent collected by a collector. In other embodiments, the concentration represents a quantity of agent per unit area, or alternately, per unit volume. In some embodiments, the concentration is a peak concentration detected within a predetermined interval of time.

Figure 1:
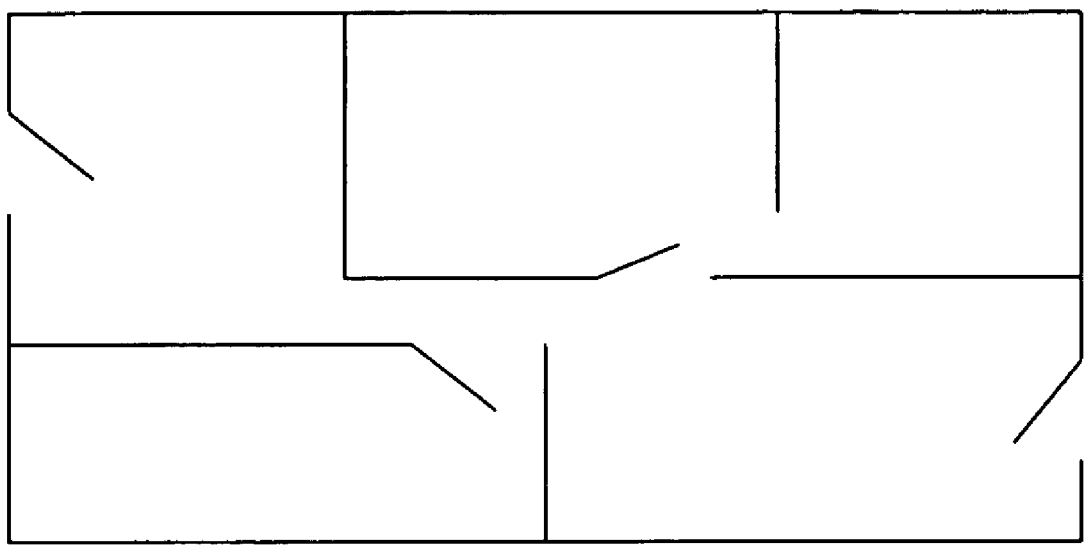
FIG. 1 depicts a floor-plan of an exemplary facility.

FIG. 1 depicts a floor-plan of an exemplary building or facility 20.

Figure 2:
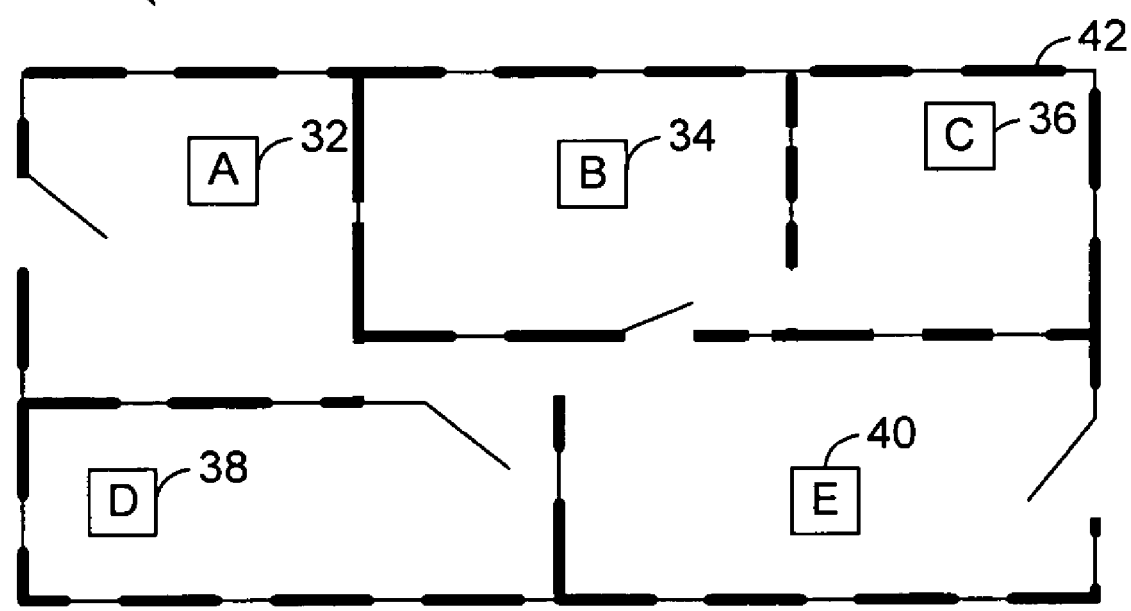
FIG. 2 depicts one example of a multi-zone model of the exemplary facility of FIG. 1.

FIG. 2 depicts one example of a multi-zone model 30 of the exemplary facility 20 of FIG. 1. The zones are bordered by dashed lines 42. The facility 20 is represented as a plurality of zones denoted by m=1, 2, ... M. An example is depicted schematically in FIG. 2 with M=5, and the zones are labeled A, B, C, D, and E, 32, 34, 36, 38 and 40, respectively. The zones are chosen with a view towards the use of a flow-modeling application or program such as CONTAM which was developed by the Building and Fire Research Laboratory of the National Institute of Standards and Technology (NIST). It is desirable for the zones to be selected such that flow within a zone can be neglected for purposes of placing detectors or evaluating dispersion of agents. That is, zones are chosen such that, within the context of the flow-modeling application to be used, a detector may be placed anywhere within the zone and receive equivalent signals from one or more agent releases occurring anywhere within that (or any other) zone or zones.

It is frequently convenient for the zones to be chosen as rooms or other more-or-less distinct geographic regions within the facility as depicted in FIG. 2, but this is not an essential limitation. Other choices for geographic zones can be made within the scope of the present invention. Also, it is often convenient to define zones in terms of the surface area or floor plan encompassed by each zone. That is, vertical distinctions are omitted when specifying zones and a zone is taken as a floor-to-ceiling region over a specified area of floor. This is also not an essential limitation of the present invention and vertically distinct zones can be used within the context of the present invention (if and to the extent allowed by the flow-modeling application used). However, for purposes of illustration and not limitation, the examples described herein will not include vertical distinctions in zones and will generally consider zones as rooms or other distinct regions of the facility.

In various embodiments of the present invention, a plurality of flow conditions, labeled n=1, 2, 3, ... N and a plurality of agent release locations i=1, 2, 3 ... I are employed. Hereinafter, when a location is designated by a discrete index i, j, m, it is presumed that the index labels a particular zone within the facility and distinctions within the zone are neglected. If it is believed that distinctions within a zone are non-negligible, it is straight-forward to apply the techniques described herein to a choice of smaller zones. Pursuant to various embodiments, detectors are placed at locations j=1, 2, ... J. Typically, the number of detectors, J, is predetermined and, in various embodiments, the problem is then to place the J detectors in the M zones so as to achieve the detectability of agent that is desired. Using zones as described herein, clearly, $J \leq M$. That is, at most one detector is placed in any zone.

Signals indicated by $S_{i,j}(n)$ are received at detector j for a predetermined quantity of agent released at location i under flow condition n. Distinct candidate architectures having one or more detectors are identified. That is, a "candidate architecture" is a distribution of the J detectors over the M zones, allowing for indistinguishability of identical detectors, each detector being in a different one of the M zones. A robust limiting case signal is determined for each candidate architecture, thereby providing a plurality of robust limiting case signals. In some embodiments, the robust limiting case signal for a particular candidate architecture is the most difficult to detect signal by the one or more detectors of that candidate architecture under the most difficult to detect flow condition, thereby providing a plurality of robust limiting case signals for the candidate architectures. One of the candidate architectures is selected based on the robust limiting case signals.

In various embodiments, and for a given number of detectors to be employed, the technique determines an advantageous (ideally, optimal) location for each detector and then computes the sensitivity of the overall detector system in terms of the minimum amount of agent released that the system is capable of detecting.

The term "detector" refers to a sensor for an agent or contaminant, including in situ detection and signal generation, as well as to detectors comprising a collector, or a collector and a sensor, among other detector configurations. In some embodiments, a collector collects an agent or contaminant on a filter for subsequent removal from the detector and laboratory analysis. The contaminant may be biological, such as anthrax spores, a particulate, chemical or other hazardous agent. In some embodiments, the filters of the collectors are collected periodically, typically every twenty-four hours, and brought to a laboratory where they are tested for the presence of a number of biological agents. Other detector embodiments include those in which a sensor provides instantaneous warning of the presence of a biological, chemical or other agent. In some embodiments, the detector is an autonomous detector which can provide warning minutes to hours after the introduction of a hazardous agent.

A typical detector has a unit detection threshold, that is, a minimum quantity of agent detectable by that detector. For detectors employing remote laboratory analysis, the unit detection threshold is the minimum amount of agent that needs to be collected in order to generate a positive detection result in the subsequent laboratory test. The unit detection threshold can vary from detector to detector even for detectors of identical type and manufacture (for example, detection characteristics can change with the age of the detector, ambient temperature or other environmental effects not accounted for explicitly in the flow model of the facility). However, to be concrete in this description, it is presumed that the characteristics of the detectors are the same from detector to detector and generalizations of the siting technique to include different detector characteristics are straight-forward.

In various embodiments, the unit detection threshold can be expressed as the number of biological units, such as spores, cells, virus particles, or other agent-containing particles, deposited on a filter in order to be detected by the laboratory processes. The unit detection threshold of a detector typically depends on the specific agent or contaminant. In various embodiments, detector siting recommendations are based on characteristics for *bacillus anthracis*, the causative agent for anthrax. The number of biological particles deposited on the filter depends on the characteristics of the collector, especially the airflow and capture efficiency of the sampler. In various embodiments, the unit detection threshold is expressed in terms of a concentration per unit area. In some embodiments, the unit detection threshold is expressed in terms of a number of agent particles, or an amount of agent, captured on a filter. In other embodiments, the unit detection threshold for a detector is expressed as a concentration per unit volume, or the number of agent-containing particles per liter of air (ACPLA). In yet another embodiment, for example for various chemical detectors and for biological sensors, the unit detection threshold is a peak concentration during a predetermined amount of time.

A candidate architecture is a detector configuration. For the example of FIG. 2, a candidate architecture is thus a distribution of J detectors in the five zones, 1≦J≦5. The candidate architecture comprises one or more zones in which each zone has a detector, and these zones are also referred to as candidate zones. A subset of the zones which are considered to be candidate detector locations, that is, candidate zones, comprises at least one and up to all the zones.

To determine the flow of contaminant in the zones, the facility is represented in a flow-modeling application using a multi-zone model. Flow-modeling applications and multi-zone models are well known. In one flow-modeling application, each zone is assumed to have a uniform concentration; and a contaminant introduced into a zone spreads throughout that zone in a negligible amount of time. The flow-modeling application calculates the flow rates between zones, and provides signals representing a concentration of contaminant that would appear in a detector in a zone j for a release of a predetermined amount of contaminant in that same or another zone, zone i. The concentration refers to an amount of contaminant per unit area, or alternately, per unit volume.

In various embodiments, the flow-modeling application simulates a release of a contaminant in each zone throughout the facility. The flow-modeling application calculates the concentration of contaminant at all possible detector locations for a release of the contaminant at all possible release locations. Various detector configurations can be investigated to find an optimal, or otherwise desirable, detector configuration.

In some embodiments, the detector siting recommendations are based on the flow-modeling application called CONTAM. CONTAM is a general purpose, multi-zone (nodal) airflow and contaminant transport analysis tool that can be used to determine contaminant transport in complex building structures, and the concentration of contaminant received by a detector. CONTAM was developed for the analysis of building ventilation systems. CONTAM models are based on facility designs and characteristics including building layout, Heating, Ventilation and Cooling (HVAC) system properties, operation considerations (e.g., if doors separating areas are opened or closed), temperature gradients and inter-zonal mixing. In some embodiments, CONTAMW 2.0 was used. The CONTAM model calculates pressure-driven flow between zones. Bi-directional flow is imposed as zone boundaries to incorporate a mixing parameter. However, the invention is not meant to be limited to CONTAM and other multi-zone airflow and contaminant transport analysis tools may be used.

In various embodiments, the flow modeling application determines and provides the concentration at the zones at a specified amount of time after a release. In some embodiments, flow modeling application determines and provides the concentration at the zones at a series of multiple time intervals after a release.

In some embodiments, the flow-modeling application performs calculations based on a contaminant release of specified size from any zone in a facility. In some embodiments, reasonable mixing between zones due to heavy passenger traffic and thermal effects are used in the model.

Figure 3A:
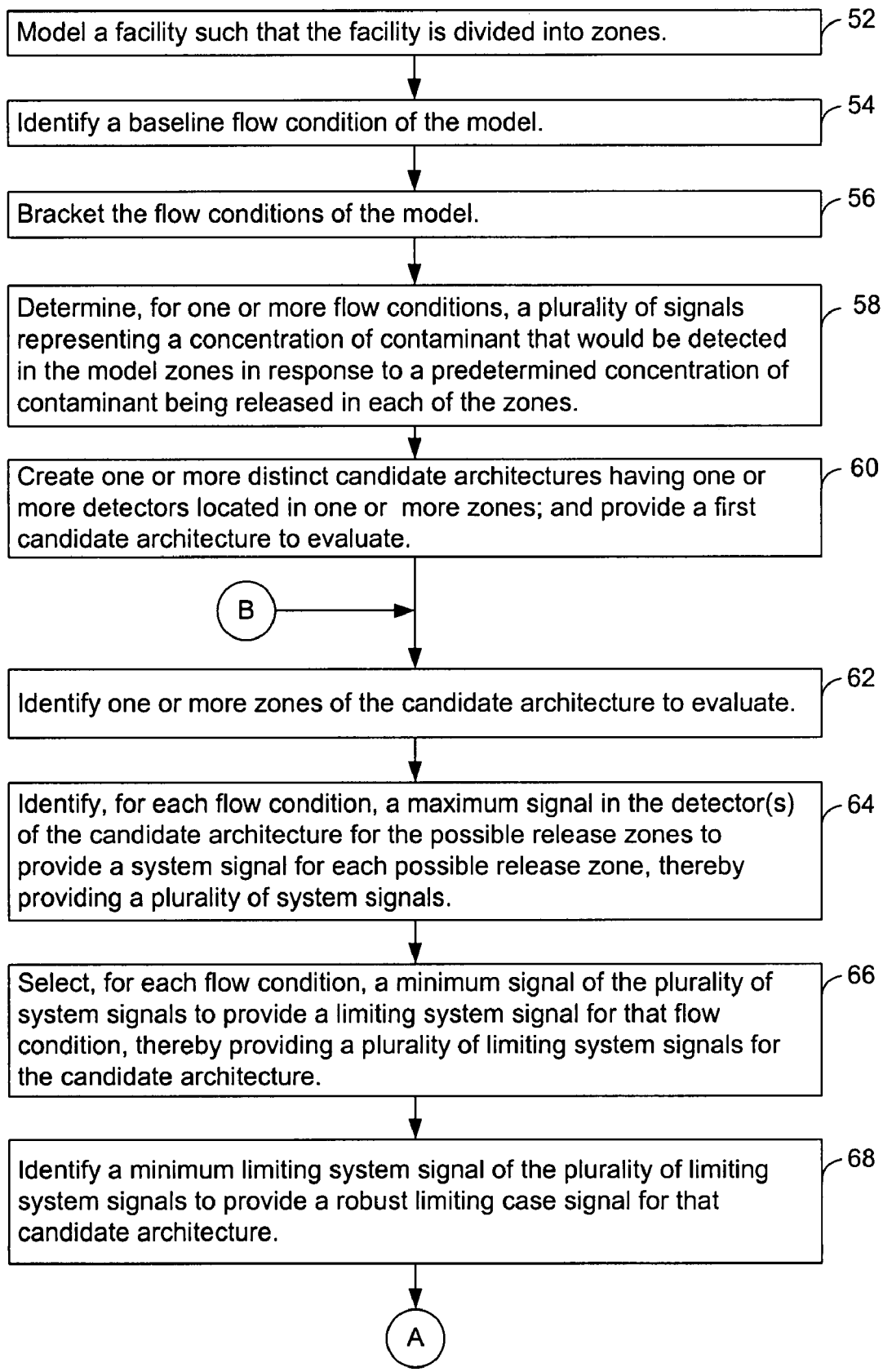
FIG. 3 comprises FIGS. 3A and 3B which collectively depict a flowchart of an embodiment of a technique to site detectors.

FIG. 3 comprises FIGS. 3A and 3B which collectively depict a flowchart of an embodiment of a technique to site detectors. In step 52, a facility is modeled such that the facility is divided into zones. In various embodiments, the facility is modeled using a flow-modeling application.

In step 54, a baseline flow condition of the model is identified. For example, a baseline flow condition has fans moving air according to the building HVAC design specifications. In various embodiments, the baseline flow condition is input to the flow-modeling application.

In step 56, the flow conditions of the model are bracketed. The bracketed flow conditions are variations on the baseline flow condition of the facility model and are intended to span the extremes of possible flow conditions that the building may experience in the course of its operation. For example, the bracketed flow conditions can comprise at least one or any combination of the following: all doors open and all doors closed, exhaust fans all blowing in and exhaust fans all blowing out, all exhaust fans on and all exhaust fans off, among other flow conditions. The bracketed flow conditions are input to the flow-modeling application.

A detector configuration which is optimized only for the baseline flow condition may result in incomplete coverage if building flow conditions change. Optimizing across multiple bracketed flow conditions produces a robust detector architecture that will provide consistent coverage. Although a baseline model might accurately reflect the flow conditions within a facility on a given day, the flow conditions within the facility will not remain constant due to seasonal or diurnal variations, or simply the opening and closing of certain doors. Rather than attempting to characterize and capture every conceivable flow condition, the flow conditions are bracketed so that the possible flow conditions will fall somewhere in between a set of limiting cases. For example, in an airport boarding area, the opening and closing of jetway doors will influence the airflow in the facility. To bracket the possible flow conditions, one model would be designed with all of the jetway doors closed and a second model would be designed with all of the jetway doors open. The number of bracketed flow conditions is dependant on the variability in the flow patterns within the facility. In a facility in which flow conditions do not change, the baseline flow condition may also be the bracketed flow condition.

In step 58, for one or more flow conditions, a plurality of signals representing a concentration of contaminant that would be detected in the various zones in response to a predetermined concentration of contaminant being released in each of the zones are determined. A set of signals is produced for each flow condition. In various embodiments, the signals represent the concentration after a predetermined amount of time from the release has elapsed. The concentration may be a quantity, such as an amount of particles, a quantity per unit area, or a quantity per unit volume, depending on the embodiment. In some embodiments, the concentration is a peak concentration during a predetermined interval. In various embodiments, a signal $S_{i,j}$ represents a concentration at a detector at zone j in response to a release of a predetermined amount of contaminant at zone i (omitting for simplicity of notation the designation of the flow condition (n), which is understood). In some embodiments, the flow-modeling application calculates a signal for each possible detector location and each possible release location. Step 58 will be discussed in further detail below with reference with FIG. 4. For example, for the facility model with five zones of FIG. 2, twenty-five signals will be provided by the flow-modeling application for a single flow condition as follows:

$$S_{1,1} \quad S_{1,2} \quad \cdots \quad S_{1,5}$$
$$S_{2,1} \quad \cdots \quad S_{2,5}$$
$$\vdots$$
$$S_{5,1} \quad S_{5,2} \quad \cdots \quad S_{5,5}$$

For the example above, for four bracketed flow conditions, one hundred signals would be produced.

To simplify the computational procedures, it is feasible in some embodiments, for one or more specified zones to be omitted as possible release locations. In other embodiments, it is feasible that one or more specified zones can be omitted as possible detector locations.

In step 60, one or more distinct candidate architectures having one or more detectors located in one or more zones are created. In various embodiments, a desired number of detectors in the candidate architecture are received from a user. In some embodiments, the user specifies an exact number of detectors. In other embodiments, the user specifies an upper limit to the number of detectors. In some embodiments, all possible permutations of possible detector locations, that is, zones, for a given or predetermined number of detectors are considered as the candidate architectures. A first candidate architecture to evaluate is provided.

In step 62, one or more zones of the candidate architecture to evaluate are identified.

In step 64, for each flow condition, a maximum signal in the detector(s) of the candidate architecture for the possible release zones are identified to provide a system signal for each possible release zone, thereby providing a plurality of system signals. Step 64 will be discussed in further detail below with reference to FIGS. 5 and 6.

In step 66, for each flow condition, a minimum system signal of the plurality of system signals is selected to provide a limiting system signal for that flow condition, thereby providing a plurality of limiting system signals for the candidate architecture.

In step 68, a minimum limiting system signal of the plurality of limiting system signals is identified to provide a robust limiting case signal for that candidate architecture. The minimum limiting system signal of the plurality of limiting system signals associated with the flow conditions for a candidate architecture is referred to as the robust limiting case signal. In various embodiments, the robust limiting case signal represents the signal that would result in a candidate architecture from a release at the most difficult to detect release location under the most difficult to detect flow condition.

Step 68 proceeds via Continuator A to step 70 of FIG. 3B.

Step 70 of FIG. 3B determines whether there are more candidate architectures to evaluate. If so, step 72 gets the next candidate architecture to evaluate, and proceeds, via Continuator B, to step 60 of FIG. 3A to evaluate, that is, to determine the robust limiting case signal for that candidate architecture.

In response to step 70 determining that there are no more candidate architectures to evaluate, in step 74, the candidate architecture associated with a maximum robust limiting case signal is selected. In various embodiments, the candidate architecture with the maximum robust limiting case signal is selected as the optimal architecture.

In step 76, the predetermined amount of contaminant released is scaled by the ratio of the maximum robust limiting case signal to the unit detection threshold of an individual detector. Using the scaling of step 76, the performance of the optimal architecture, measured in the minimum amount of contaminant released that can be detected by the architecture, is determined. In some embodiments, step 76 is omitted.

In various embodiments, therefore, for a detector system having a given configuration of detectors, that is, number and location of detectors, the technique determines a minimum sensitivity of the detector system to a predetermined amount of contaminant released in any one of the zones. In some embodiments, the technique is used to determine the minimum amount of contaminant that must be released to ensure detection from a release point in any one of the zones.

In some embodiments, steps 52, 54 and 56 provide inputs to the flow-modeling application, and the flow-modeling application performs step 58 of FIG. 3; and a detector siting module performs various embodiments described above, in steps 60 to 76 of FIG. 3. In various embodiments, the flow-modeling application determines the signals, and provides the signals to a detector siting module. The detector siting module receives the signals. In some embodiments, the detector siting module receives the signals as specified parameters; and in other embodiments, the detector siting module receives the signals using a specified file name with the signals having a predetermined format; and in another embodiment, the detector siting module receives the signals from a predetermined location in memory. In yet another embodiment, the flow-modeling application and the detector siting module are combined in a single application.

In another embodiment, the flow-modeling application provides a table of the concentration of contaminant throughout a zone j from a release in a zone i after a predetermined amount of time has elapsed since the release for each flow condition. To determine the amount of contaminant that reaches a detector, in step 58, the concentration in zone j is multiplied by the flow rate of the detector to provide an amount of contaminant deposited in a detector. In this way, a table of signals which represent an amount of contaminant which is deposited in a detector can be provided.

Various steps of the flowchart of FIG. 3 will now be described.

FIG. 4 depicts an exemplary table 80 of signals representing a total number of spores collected by a detector located in each zone which is a possible detector location given a one gram release of spores from each zone which is a possible release location for one flow condition after twenty-four hours have elapsed from the release. In various embodiments, the flow condition is a bracketed flow condition. Table 80 is also referred to as a flow-condition-signal table. The flow-condition-signal table 80 was determined by the flow-modeling application. In FIG. 4, the exemplary flow-condition signal table 80 comprises a plurality of signals $S_{i,j}(n)$ for a flow condition, n. The signals of the flow-condition-signal table 80 were produced by the flow-modeling application in step 58 of FIG. 3A. FIG. 4 shows the possible detector locations 82 and the possible release locations 84. In FIG. 4, for example, for a one gram release of spores in Zone A, a detector in Zone A would collect a signal of $151 \times 10^6$ spores; and a detector in zone E would not collect any spores. In another example, for a one gram release in zone C, a detector in zone A would collect a signal of $0.1 \times 10^6$ spores, and a detector in zone B would not collect any spores.

As shown in table 80, the release of the contaminant is modeled from every possible release location, that is, zone, within the facility model. In some embodiments, the location of the release within a zone is specified; therefore, some zones may have multiple releases. For example, releases may be modeled to occur every twenty-five feet down a hallway. In various embodiments, in step 58, releases are considered from all possible release locations so that the final architecture will be able to detect a release that may occur anywhere in the facility model. In some embodiments, in step 58, as shown in FIG. 4, detectors are modeled at every possible location, that is, zone, within the facility model. In various embodiments, as shown in FIG. 4, this results in the table 80 which shows what signal a release of contaminant in each of all possible release locations, that is, zones, would produce in a detector in each of all possible detector locations. In step 56, a separate flow-condition-signal table 80 is produced for each flow condition.

In another embodiment, the table 80 provides a peak concentration that a detector would receive during a predetermined amount of time after a release.

In various embodiments, in step 58, a candidate architecture is created by considering a detector in any combination of possible detector locations such that the total number of detectors under consideration is equal to the desired number of detectors in the final candidate architecture.

In this example, two detectors are desired in the final architecture. Therefore, the possible permutations, and hence the candidate architectures, comprise detectors in zones A and B, A and C, A and D, A and E, B and C, B and D, B and E, C and D, C and E, and D and E.

As shown by arrows 90 and 92, the candidate architecture being evaluated has detectors in zones A and D, respectively. Therefore in step 62, the identified candidates are zones A and D.

FIG. 5 depicts an exemplary table 98 of signals for the detector locations of a candidate architecture based on the table of FIG. 4. The exemplary table 98 is also referred to as a candidate-flow-condition-signal table. In some embodiments, the candidate-flow-condition-signal table 98 is created in step 64. In this example, the candidate-flow-condition-signal table 98 comprises the signals in the possible detector locations of zone A and zone D.

FIG. 6 depicts an exemplary system table 100 comprising system signals for the detector locations of the candidate architecture of FIG. 5. In various embodiments, the system table 100 of FIG. 6 is produced in step 64. For each release location, the system signal from each possible release location is equal to the maximum signal produced in any of the detectors in the candidate architecture for that release location. For example, in FIG. 5, for the release in zone E 102, the detector in zone A would detect $4 \times 10^6$ spores and the detector in zone D would detect $0.3 \times 10^6$ spores, therefore, the system signal 104 for zone E is the maximum of [$4 \times 10^6$, $0.3 \times 10^6$] which is $4 \times 10^6$ spores.

Although step 64 was described using the flow-condition-signal table 80 and the candidate-flow-condition-signal table 98, in some embodiments, the candidate-flow-condition-signal table 98 of FIG. 5 is not created and the system table 100 is created directly from the flow-condition-signal table 80 of FIG. 4.

Step 66 determines the limiting system signal for a flow condition. The limiting system signal is equal to the signal produced by a release at the location the gives the minimum overall system signal. As shown in FIG. 6, the limiting system signal 106 is $4 \times 10^6$ spores. Each candidate architecture has a limiting system signal for each flow condition.

FIG. 7 illustrates a set 110 of n exemplary tables, one for each bracketed flow condition, each table containing a set of signals for that flow condition.

FIG. 8 depicts a set 120 of exemplary system signal tables 122, 124, 126 and 128 for four flow conditions of a candidate architecture, and the limiting system signal 132, 134, 136 and 138, for each system signal table 122, 124, 126 and 128, respectively, to provide a plurality of limiting system signals. In step 68, as shown in FIG. 8, the robust limiting case signal is associated with flow condition 3 and has a value of $3 \times 10^6$ spores 136.

Step 70 determines if there are more candidate architectures to evaluate, and if so, step 72 gets a next candidate architecture and proceeds to step 60 to evaluate that architecture.

In step 74 of FIG. 4B, the candidate architecture associated with a maximum robust limiting case signal is selected.

In some embodiments, in step 60, the number of possible detector locations is restricted in the candidate architectures. For example, one restriction may specify that at least one detector must be in a certain region, that is zone, or a plurality of zones, of the building. Alternately, a restriction may specify that at least one zone does not have a detector.

In other embodiments, the impact of a release is calculated and the architecture that is selected provides the smallest maximum impact.

FIG. 9 depicts a flowchart of an embodiment of additional steps performed by the flowchart of FIG. 3 to select an architecture based on the impact of a release. In step 140, a specified impact-value is received for each detector location. In some embodiments step 140 is performed prior to step 60 of FIG. 3A.

In step 142, the impact-value associated with the detector location j is applied to the signal produced at that location j to adjust the signal $S_{i,j}$ in the table of FIG. 4. In some embodiments, step 142 is performed after step 58 and prior to step 64 of FIG. 3A.

FIG. 10 depicts a table 150 of signals which have been adjusted by their associated impact-values. For example, assume that the impact-values represent the number of people affected by the release in each zone, and that the impact-values for the possible detector locations in zones A, B, C, D, and E are 10, 20, 1, 100 and 30, respectively. In step 142, the impact-values are multiplied by their associated signal in the table 80 of FIG. 4 to produce table 150. For example, the signals for the possible detector location in zone A are multiplied by 10, and the signal $S_{1,1}$ of Table 80 (FIG. 4) of $151 \times 10^6$ is multiplied by 10 to provide a signal of $1510 \times 10^6$ in Table 150 (FIG. 10). Steps 60 to 74 of FIG. 3 are applied to table 150, rather than table 80 of FIG. 4. In this way, a detector location can be more heavily weighted and therefore the likelihood of choosing a candidate architecture with that detector location is increased. In this embodiment, the sensitivity of the selected candidate architecture is calculated without the weighting factors.

In an alternate embodiment, the impact-values are associated with the possible release locations rather than the detector locations. In this embodiment, to more heavily weight a particular release location, the signals associated with the particular release location would be divided by its associated impact-value.

In an alternate embodiment, the impact-values are assigned to each zone based on the value of the target in that zone. For example, a zone containing the office of a high ranking official may be assigned one hundred points, while a zone used as a storage closet which is infrequently accessed would be assigned one point.

In some embodiments, a detector architecture can be designed based on protecting the largest number of people in a facility. In yet another embodiment, the signals are adjusted to represent a number of people in zone j that are infected by a release in zone i based on the number of people in zone j, the concentration of contaminant reaching zone j, and the probability of infection based on the exposure, that is, the concentration of contaminant reaching zone j. Alternately, the signals are adjusted to represent a number of deaths in zone j based on the number of people in zone j, the concentration of contaminant reaching zone j, and the probability of death based on the concentration of contaminant reaching zone j. Steps 60 to 74 of FIG. 3 are applied to these signals which represent a number of people harmed.

In yet another embodiment, the signals are adjusted so that the signals represent, and therefore, optimization is based on, the probability of infection in zone j for a release in zone i multiplied by the impact-value. Alternately, the signals are adjusted to represent the probability of death in zone j for a release in zone i multiplied by the impact-value.

In other embodiments, an equal probability of release in each of the zones is not used. Specific release locations may be weighted more heavily than others. In some embodiments, weighting can be used when the desired probability of detection is less than one hundred percent. In this embodiment, in step 68 of FIG. 3A, the robust limiting case signal is the smallest value from a subset of release locations wherein the sum of the weights of the release locations is equal to a predetermined probability of release, where the predetermined probability of release is less than one hundred percent, rather than the minimum limiting system signal.

Figure 11A:
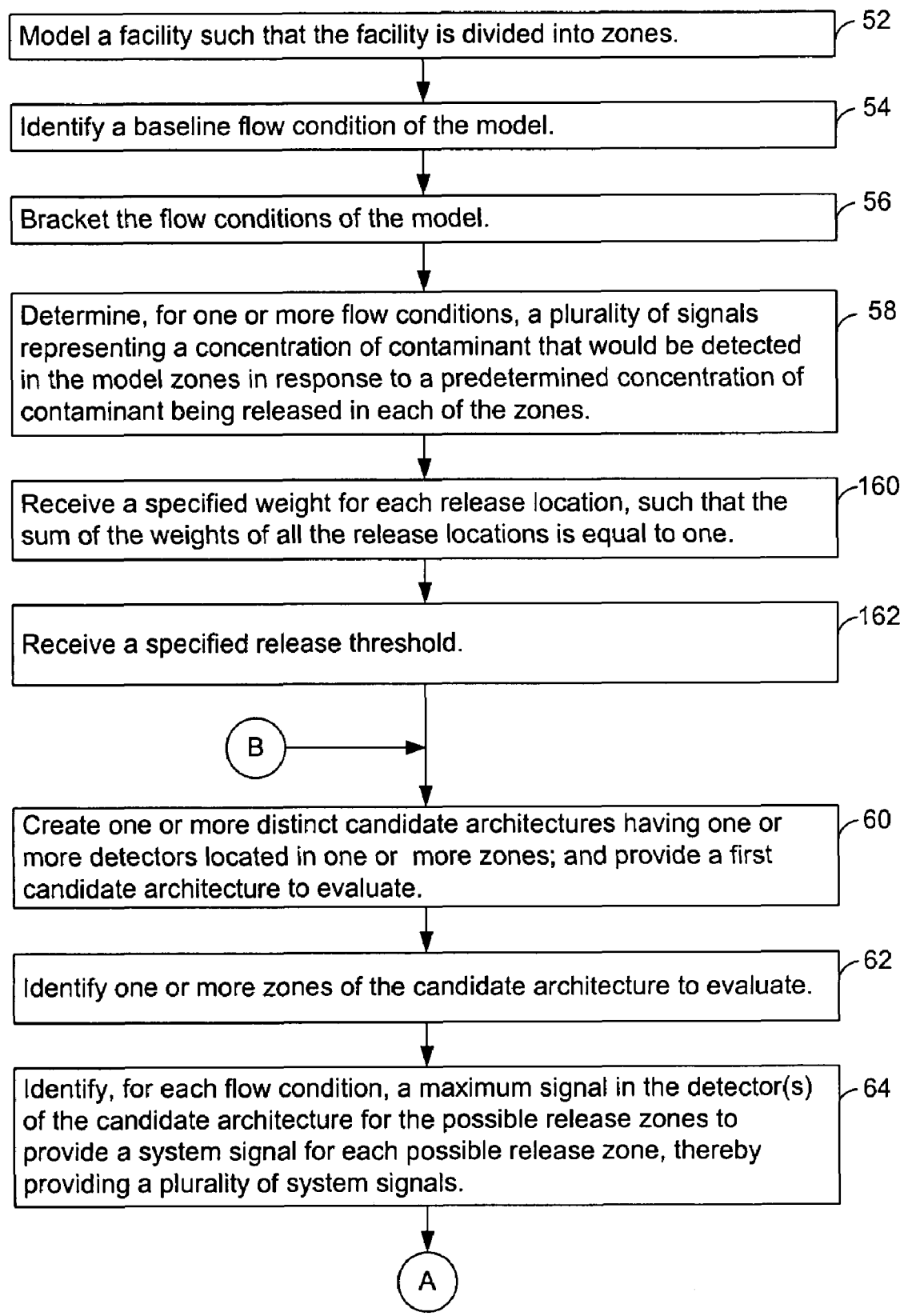
FIG. 11 comprises FIGS. 11A and 11B which collectively depict a flowchart of an embodiment of applying weights in a technique to site detectors.
Figure 11B:
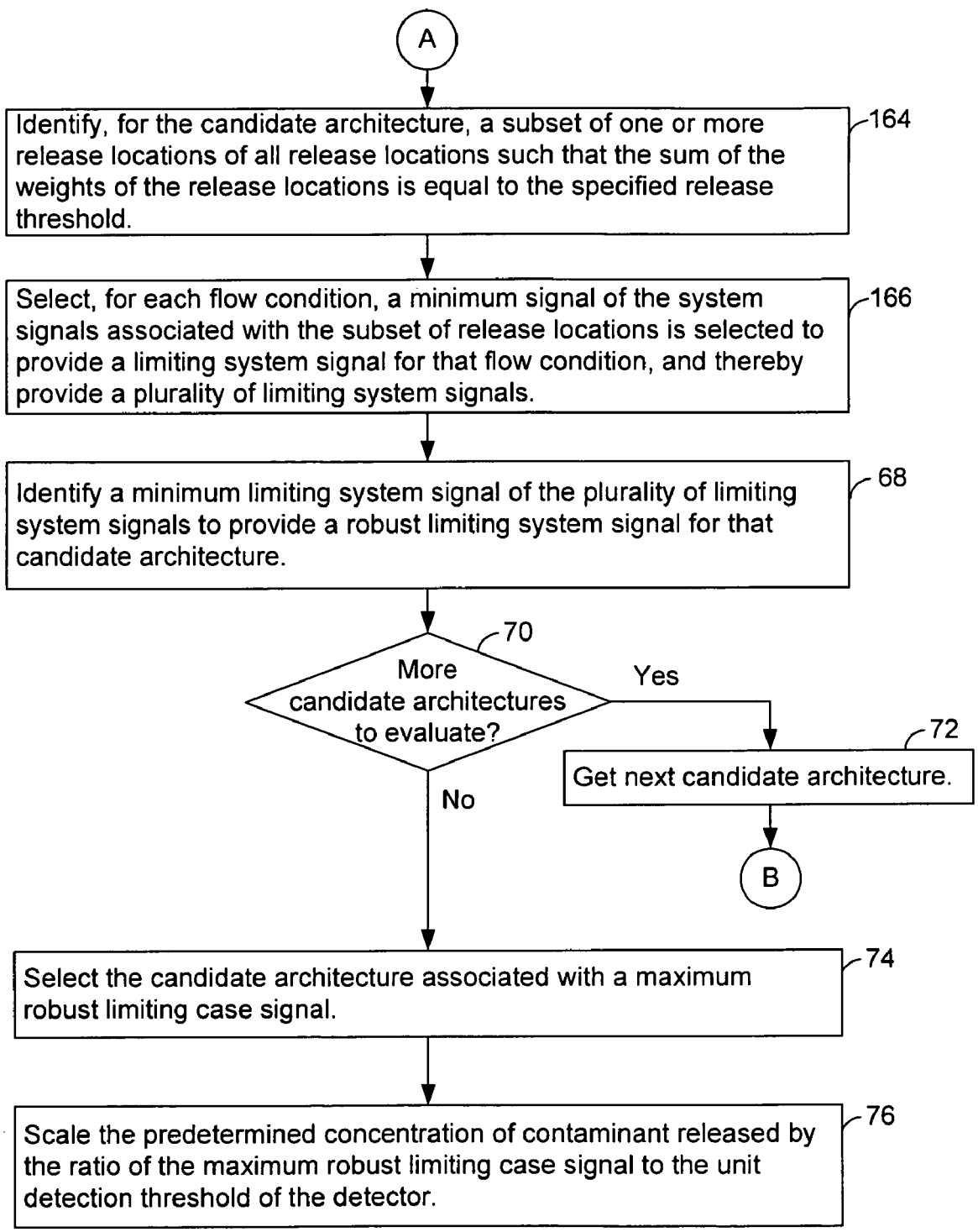

FIG. 11 comprises FIGS. 11A and 11B which collectively depict a flowchart of an embodiment of applying weights in a technique to site detectors. In some embodiments, weighting is used if the probability of detection is less than 100% and is used when determining the robust limiting case value. The smallest value from a subset, that is, less than all, of the release locations is selected as the limiting system signal for the flow conditions.

Steps 52, 54, 56, 58, 60, 62, 64, 68, 70, 72, 74 and 76 of FIG. 11 have been described with reference to FIG. 3 and will not be further described. The differences between FIG. 11 and FIG. 3 will now be described.

After step 58, in step 160, a specified weight for each release location is received. The sum of the specified weights of all the release locations is equal to one. In step 162, a specified release threshold value is received.

After step 64, in step 164, a subset of one or more release locations of all release locations are identified such that the sum of the weights of the release locations is equal to the specified release threshold.

In step 166, a minimum signal of the system signals associated with the subset of release locations is selected to provide a limiting system signal for each flow condition. In various embodiments, steps 164 and 166 are performed rather than step 66 of FIG. 3A.

In some embodiments, the flow-modeling application is considered as providing order of magnitude estimates for the dispersal of airborne contamination for some facilities because of the flow conditions in those facilities.

FIG. 12 depicts a flowchart of an embodiment of determining a number of people that would be infected by a release that does not result in detection by the system. The flowchart of FIG. 12 is performed instead of step 62 of FIG. 3A. In FIG. 12, the population of the facility is a static population in which people are in the same zone throughout the time interval after the release. The total exposure of the population of a zone is calculated based on the historical contaminant concentration/time of that zone at a series of time intervals after the release, the concentration in the room is multiplied by the breathing rate of a person. This is similar to the calculation performed to determine the amount of contaminant on a collector, except that the flow rate through the collector is used rather than the breathing rate of a person. Once the amount of contaminant that a person is exposed to is calculated, the probability of infection is determined based on the amount that the person is exposed to. The calculation of the probability of infection is well-known to those skilled in the art.

An embodiment of a process for optimizing detector locations based on the number of people infected for the static population will now be described. The process can be applied to various contaminants. In step 170, a candidate architecture is selected. In step 172, for each flow condition, for each possible release zone i, a maximum concentration of contaminant received by any detector of the candidate architecture for a release of a predetermined concentration of contaminant from zone i is identified. In various embodiments, the flow conditions comprise a baseline flow condition and bracketed flow conditions. In particular, in some embodiments, the system table of FIG. 6 is identified from the signals of step 58 for the candidate architecture. For example, for a release of a number of spores from each zone i, FIG. 6 indicates the maximum number of spores that will be collected by one of the detectors of the candidate architecture for the release from zone i.

In step 174, for each flow condition, the release size associated with each zone is scaled to determine the maximum release in zone i that is equal to the unit detection threshold. The release size in every zone is scaled so that the maximum release in Zone A that will result in the concentration of contaminant required for detection on one of the detectors. This is considered to be the largest possible release that would be undetected, or alternatively, the smallest possible release that would be detected.

In step 176, for each flow condition, for a plurality of time intervals, a table comprising a concentration of contaminant in each zone j for a release of the predetermined concentration of contaminant from zone i is received. In some embodiments, a single table is provided for each flow condition and time interval. In other embodiments, a single table is provided for all flow conditions and time intervals.

In step 178, a table of signals representing an amount of contaminant that persons in a zone are exposed to for each flow condition is produced. To produce the table which has signals representing an amount of contaminant that a person in a zone is exposed to for each flow condition, in step 178, for a particular flow condition, for a zone j, the concentration of contaminant in a zone j over a predetermined number of time intervals is summed and multiplied by the breathing rate of a person to provide an amount of contaminant deposited in a person's lungs. The amount of contaminant in a person's lungs is scaled by the amount of contaminant required for detection in that zone to determine what a person in that zone is exposed to. For example, the release is scaled by 500 micrograms/1 gram to calculate what a person in each zone would be exposed to for a 500 microgram release in zone A for signals calculated based on a predetermined release of 1 gram. The probability of infection based on the amount of contaminant inhaled is determined. For example, a look-up table may provide a mapping of amount of contaminant inhaled, such as spores, and the probability of infection for a single person. The probability of infection is multiplied by the number of people in that zone. This determination of the number of persons infected is repeated for releases in all zones to determine the number of people that would be infected by the largest possible release that would go undetected in every zone, for each flow condition. In this way, a set of tables, one for each flow condition, is provided; each table contains signals representing the number of people in a zone j that would be infected because of an undetected release from zone i. Therefore, applying steps 60 to 74 of FIG. 3 to this set of tables, the candidate architecture which is selected has the least number of infections for its most damaging release.

In an alternate embodiment, signals representing the number of deaths are determined, rather than the number infected. The candidate architecture which is selected has the least number of deaths for its most damaging release.

In yet another embodiment, the detector architecture is selected based on a moving population in the facility. In this embodiment, at least a portion, and in some embodiments all, of the members a population are moving throughout the facility and breathing different concentrations in different zones, rather than breathing the same concentration in a single zone. For a moving population, in some embodiments, each person is tracked individually. The maximum release size for each possible release location that would go undetected by a particular architecture is calculated, and then those releases and the concentration/time profile produced by the releases in the rest of the building are simulated.

Figure 13:
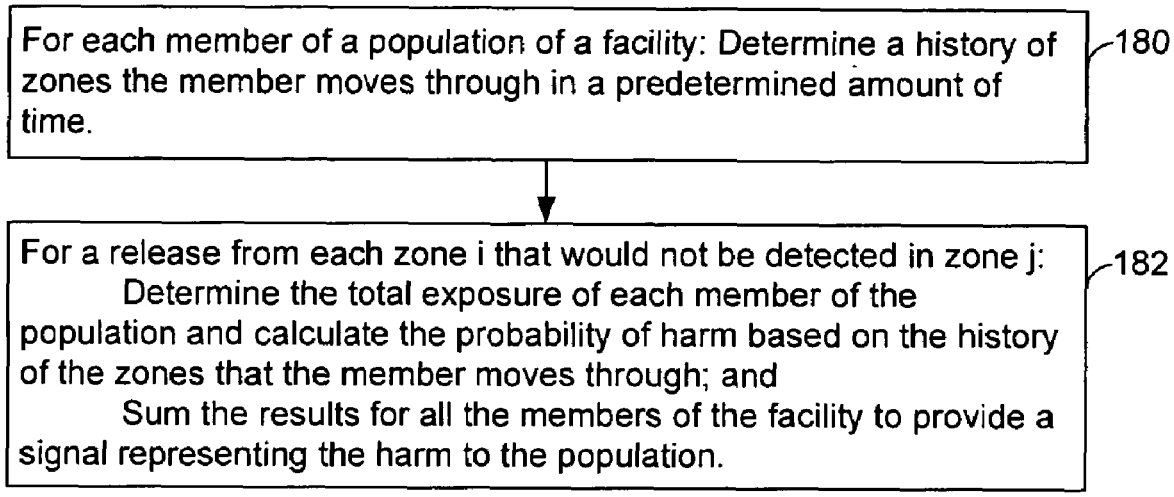
FIG. 13 depicts a flowchart of an embodiment of determining a signal representing harm to a moving population in a facility in a zone j in response to a release in a zone i.

FIG. 13 depicts a flowchart of an embodiment of additional steps performed with the flowchart of FIG. 3 to site detectors based on a moving population. In step 180, for each member of a population of a facility, a history of the zones the member moves through in a predetermined amount of time is determined. In some embodiments, step 180 is performed prior after step 60 and prior to step 62 of FIG. 3.

In step 182, for a release from each zone i that would not be detected in a zone j, the total exposure of each member of the population is determined and the probability of harm is calculated based on the history of the zones that the member moves through. The probability of harm may be the probability of infection or death depending on the contaminant. The results for all the members of the facility is summed to provide a signal representing the harm to the population.

To determine a history of the movement of people through the zones, people are randomly assigned to one of the facility entrances. A percentage represents the likelihood that people will enter from that entrance. A "connection matrix" which is an M×M matrix where M is the number of zones is defined. If two zones are connected (that is, if it is possible for a person to go from one zone to the other), a one is stored in the connection matrix, otherwise a zero is stored. For example, in the exemplary facility model of FIG. 2, because a person can go directly from zone A to zone D, zone A is connected to zone D, therefore element (1, 4) of the connection matrix contains a value of one. An exemplary connection matrix for the facility model of FIG. 2 is as follows:

|  | A(1) | B(2) | C(3) | D(4) | E(5) |
|---|---|---|---|---|---|
| A(1) | 1 | 0 | 0 | 1 | 1 |
| B(2) | 0 | 1 | 1 | 0 | 1 |
| C(3) | 0 | 1 | 1 | 0 | 0 |
| D(4) | 1 | 0 | 0 | 1 | 1 |
| E(5) | 1 | 1 | 0 | 1 | 1 |

In the exemplary connection matrix above, the number in parentheses represents the zone number.

In some embodiments, limits on connections that can only handle a limited number of people at a time are assigned. For example, fire code data can be used to calculate the number of people per minute that can pass through a stairway.

Each person is then assigned a destination. The number of zones (distance) from the destination zone is calculated for every other zone in the facility. For example, in FIG. 2, zone A is three zones from zone C and zone C is the destination, therefore zone A is assigned a value of three; and the distance of a zone to itself, for example, zone C to zone C, is assigned a value of zero; zone E, which is two zones from zone C is assigned a value of two, and zone B, which is one zone from zone C is assigned a value of one. A second M×M matrix, referred to as a "positive movement matrix," is created, and a one is stored in every element (r, s) where moving from the current zone (r) to that zone (s) would result in the distance number being reduced (that is, getting closer to the destination). An exemplary positive movement matrix for the facility model of FIG. 2 and a destination of zone C is as follows:

|  | A(1) | B(2) | C(3) | D(4) | E(5) |
|---|---|---|---|---|---|
| A(1) | 0 | 0 | 0 | 0 | 1 |
| B(2) | 0 | 0 | 1 | 0 | 0 |
| C(3) | 0 | 0 | 1 | 0 | 0 |
| D(4) | 0 | 0 | 0 | 0 | 1 |
| E(5) | 0 | 1 | 0 | 0 | 0 |

A third matrix, referred to as the "neutral movement matrix", is created, and a one is stored in every element (r, s) where movement from a zone (r) to a zone (s) results in the same distance number. In various embodiments, there is one connection matrix for the facility, but there is a positive and neutral movement matrix for each destination. An exemplary neutral movement matrix for the facility model of FIG. 2 for a destination of zone C is as follows:

|  | A(1) | B(2) | C(3) | D(4) | E(5) |
|---|---|---|---|---|---|
| A(1) | 0 | 0 | 0 | 1 | 0 |
| B(2) | 0 | 0 | 0 | 0 | 0 |
| C(3) | 0 | 0 | 0 | 0 | 0 |
| D(4) | 1 | 0 | 0 | 0 | 0 |
| E(5) | 0 | 0 | 0 | 0 | 0 |

When a person is assigned a destination, that person is associated with a master movement matrix, which is equal to the connection matrix+Y times the positive movement matrix+Z times the neutral movement matrix. Y and Z represent how much people move in the facility. Values of Y=0 and Z=0 causes totally random movement; very large values of Y mean that people go directly to their destination. In some embodiments, values of Y=2 and Z=1 are used; in other embodiments, other values of Y and Z may be used. For example, referring also to FIG. 2, a exemplary master movement matrix for a person in zone A with a destination of zone C, with Y=2 and Z=1, would appear as follows:

|  | A(1) | B(2) | C(3) | D(4) | E(5) |
|---|---|---|---|---|---|
| A(1) | 1 | 0 | 0 | 2 | 3 |
| B(2) | 0 | 1 | 3 | 0 | 1 |
| C(3) | 0 | 1 | 3 | 0 | 0 |
| D(4) | 2 | 0 | 0 | 1 | 3 |
| E(5) | 1 | 3 | 0 | 1 | 1 |

To determine where a person goes, each of the columns in the master movement matrix is multiplied by a different random number. The column with the highest value is where the person goes. A person can also stop along the way, for example, at restaurants or shops, by creating dummy zones that have movement matrices, for example, as follows:

|  | A(1) | B(2) | C(3) | D(4) | E(5) | Shop(6) |
|---|---|---|---|---|---|---|
| A(1) | 1 | 0 | 0 | 2 | 3 | 0 |
| B(2) | 0 | 1 | 3 | 0 | 1 | 0 |
| C(3) | 0 | 1 | 3 | 0 | 0 | 0 |
| D(4) | 2 | 0 | 0 | 1 | 3 | 0 |
| E(5) | 1 | 3 | 0 | 1 | 1 | 1 |
| Shop(6) | 0 | 0 | 0 | 0 | 1 | 5 |

For example, if a person go into a shop, that person stays there for a while before leaving. The sixth zone, shop (6), represents an intermediate destination, the shop. Assume that zone E has a shop. Zone 6 represents the shop in zone E. The population movement module has the sixth zone for the shop. To determine the exposures, after the population movement is calculated, all the zone 6's, the shop (6), in a person's movement history are replaced with zone E so that a person stopping in the shop receives the same concentration as in zone E. The value of five for shop (6) represents a factor that determines the amount of time that a person stays in the shop. When a person is in a shop, they have a higher probability of remaining in the shop than exiting. By varying the factor associated with the shop, the average number of time steps that the person remains in the shop is varied. For example, in some embodiments, a five means that a person has a 90% chance of staying in the shop every timestep, so that person will stay an average of 10 minutes. The average residence time is equal to two times the number in that space.

In this way, the history of the zones that a person was in during their time in the facility is provided. This history is used to determine that person's exposure to the concentration in a zone for the time that person was in the zone. For example, a person's movement history is as follows:

| Time | Zone |
|------|------|
| 1    | A    |
| 2    | B    |
| 3    | C    |
| 4    | B    |
| 5    | A    |

The person would be exposed to the concentration of agent in zone A at time one minute for a predetermined amount of time, in this example, a period of one minute, (by taking the concentration in the zone and multiplying by the breathing rate to determine the amount of contaminant inhaled), then that person would be exposed to the concentration of agent in zone B at time two for a period of one minute, and the exposure is similarly determined for zone C. The person's total exposure is summed, and the probability of infection or probability of death, depending on the agent, is calculated. The results are summed for the entire facility population and that is the effect of that release. For all the release locations, releases of the largest possible release size that would go undetected are created. In various embodiments, a table of signals representing the effect of a contaminant in zone j from a release in zone i, for each flow condition to provide a set flow-condition signal tables for each candidate architecture. In some embodiments, the production of the flow-condition signal tables for a moving population is provided by a population-movement module. The robust limiting case signal is determined for each candidate architecture and a candidate architecture is selected as described above.

Figure 14:
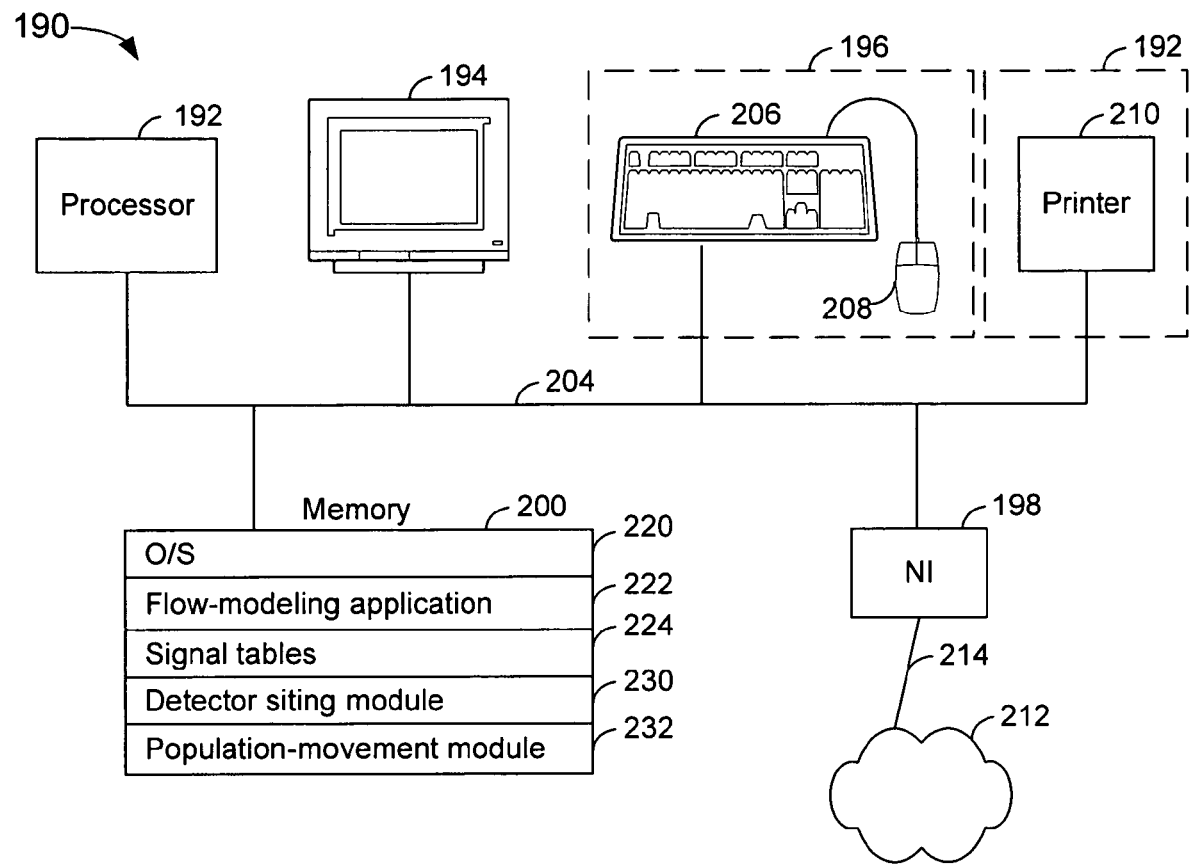
FIG. 14 depicts an illustrative computer system using the various embodiments of the present invention.

FIG. 14 depicts an illustrative computer system 140 using various embodiments of the present invention. In some embodiments, the computer system 190 comprises a processor 192, display 194, input interfaces (I/F) 196, communications interface 198, memory 200 and output interface(s) 202, all conventionally coupled by one or more buses 204. The input interfaces 196 comprise a keyboard 206 and a mouse 208. The output interface 202 comprises a printer 210. The communications interface 198 is a network interface (NI) that allows the computer system 190 to communicate via a network 212, such as the Internet. The communications interface 198 may be coupled to a transmission medium 214 such as a network transmission line, for example, twisted pair, coaxial cable or fiber optic cable. In another embodiment, the communications interface 198 provides a wireless interface, that is, the communication interface 198 uses a wireless transmission medium.

The memory 200 generally comprises different modalities, illustratively semiconductor memory, such as random access memory (RAM), and disk drives. In various embodiments, the memory 200 stores an operating system 220, the flow-modeling application 222, tables 224, the detector siting module 230 and the population-movement module 232.

In various embodiments, the specific software instructions, data structures and data that implement various embodiments of the present invention are typically incorporated in the detector siting module 180. Generally, an embodiment of the present invention is tangibly embodied in a computer-readable medium, for example, the memory 220 and is comprised of instructions which, when executed by the processor 192, causes the computer system 190 to utilize the present invention. The memory 200 may store the software instructions, data structures, and data for any of the operating system 220, the flow-modeling application 222, tables 224, and the detector siting module 230, in semiconductor memory, in disk memory, or a combination thereof.

The operating system 220 may be implemented by any conventional operating system such as Windows® (Registered trademark of Microsoft Corporation), Unix® (Registered trademark of the Open Group in the United States and other countries) and Linux® (Registered trademark of Linus Torvalds).

In various embodiments, the present invention may be implemented as a method, system, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system 190 illustrated in FIG. 14 is not intended to limit the present invention. Other alternative hardware environments may be used without departing from the scope of the present invention.

Although various embodiments which incorporate the teachings of the present invention have been shown and described in detail herein, those skilled in the art can readily devise many other varied embodiments that still incorporate these teachings.

What is claimed is:

1. A method of identifying sites for one or more detectors in a facility, said facility represented with a plurality of zones, comprising:

providing a plurality of signals $S_{i,j}$, each signal $S_{i,j}$ representing an effect in a zone j in response to a release of a predetermined amount of a contaminant in a zone i for one or more flow conditions, wherein zone i and zone j are identical or distinct zones selected from the group consisting of said plurality of zones;

determining a limiting case signal for each flow condition of said one or more flow conditions for each candidate architecture of a plurality of distinct candidate architectures having one or more detectors in one or more zones as one or more candidate zones, respectively, said limiting case signal being a smallest system signal of a system set comprising a plurality of system signals, each of said system signals being associated with said release in a distinct zone of said plurality of zones, each system signal being a maximum one of said signals representing said effect in said one or more candidate zones from said release in said distinct zone of said plurality of zones for said each flow condition;

determining, for each candidate architecture, a robust limiting case signal based on a minimum of said each limiting case signal for said each flow condition; and selecting one of said plurality of candidate architectures as the siting architecture based on said robust limiting case signal of said each candidate architecture, identifying the sites of said siting architecture as the sites for said one or more detectors in said facility.

2. The method of claim 1 wherein said selecting selects said candidate architecture associated with said robust limiting case signal having a highest value.

3. The method of claim 2 wherein said effect is a concentration of said contaminant, further comprising:

scaling said predetermined amount of contaminant released by a ratio of said robust limiting case signal having said highest value to a unit detection threshold of at least one of said detectors to provide a minimum concentration detected by said candidate architecture.

4. The method of claim 1 wherein said one or more flow conditions comprise bracketed flow conditions.

5. The method of claim 1 wherein said effect represents an amount of contaminant collected by a detector.

6. The method of claim 1 wherein said effect represents a concentration of said contaminant.

7. The method of claim 1 further comprising:

identifying said plurality of distinct candidate architectures based on a specified number of detectors.

8. The method of claim 1 further comprising:

identifying said plurality of distinct candidate architectures based on one or more weights associated with having a detector in said one or more zones, respectively, wherein a sum of said weights associated with said detectors of said candidate architecture is equal to a predetermined threshold.

9. The method of claim 1 further comprising:

designating at least one of said zones as a designated zone; and identifying said plurality of distinct candidate architectures such that said designated zone is one of said candidate zones.

10. An article of manufacture comprising a computer usable medium embodying one or more instructions for performing a method of identifying sites for one or more detectors in a facility, said facility represented with a plurality of zones, said method comprising:

providing a plurality of signals $S_{i,j}$, each signal $S_{i,j}$ representing an effect in a zone j in response to a release of a predetermined amount of a contaminant in a zone i for one or more flow conditions, wherein said zone i and zone j are identical or distinct zones selected from the group consisting of said plurality of zones;

determining a limiting case signal for each flow condition of said one or more flow conditions for each candidate architecture of a plurality of distinct candidate architectures having one or more detectors in one or more zones as one or more candidate zones, respectively, said limiting case signal being a smallest system signal of a system set comprising a plurality of system signals, each of said system signals being associated with said release in a distinct zone of said plurality of zones, each system signal being a maximum one of said signals representing said effect in said one or more candidate zones from said release in said distinct zone of said plurality of zones for said each flow condition;

determining, for each candidate architecture, a robust limiting case signal based on a minimum of said each limiting case signal for said each flow condition; and selecting one of said plurality of candidate architectures as the siting architecture based on said robust limiting case signal of said each candidate architecture, identifying the sites of said siting architecture as the sites for said one or more detectors in said facility.

11. The article of manufacture of claim 10 wherein said selecting selects said candidate architecture associated with said robust limiting case signal having a highest value.

12. The article of manufacture of claim 11 wherein said effect is a concentration of said contaminant, said method further comprising:

scaling said predetermined amount of contaminant released by a ratio of said robust limiting case signal having said highest value to a unit detection threshold of at least one of said detectors to provide a minimum concentration detected by said candidate architecture.

13. The article of manufacture of claim 10 wherein said effect represents an amount of contaminant collected by a collector.

14. The article of manufacture of claim 10 wherein one or more of said zones that are possible detector locations are associated with one or more impact-values, respectively, further comprising:

applying said one or more impact-values to said signals associated with said one or more zones that are possible detector locations to adjust said signals.

15. The article of manufacture of claim 10 wherein one or more of said zones that are possible release locations are associated with one or more impact-values, respectively, further comprising:

applying said one or more impact-values to said signals associated with said one or more zones that are possible release locations to adjust said signals.

16. The article of manufacture of claim 10 wherein said effect represents a number of people in said zone j affected by said release in zone i.

17. The article of manufacture of claim 14 wherein said number of people is based on a static population in said facility.

18. The article of manufacture of claim 14 wherein said number of people is based on a moving population in said facility.

19. A computer system to identify sites for one or more detectors in a facility, said facility represented with a plurality of zones, comprising:

a processor; and a memory comprising one or more instructions, executable by said processor, that:

receive a plurality of signals $S_{i,j}$, each signal $S_{i,j}$ representing an effect in a zone j in response to a release of a predetermined amount of a contaminant in a zone i for one or more flow conditions, wherein said zone i and zone j are identical or distinct zones selected from the group consisting of said plurality of zones;

determine a limiting case signal for each flow condition of said one or more flow conditions for each candidate architecture of a plurality of distinct candidate architectures having one or more detectors in one or more zones as one or more candidate zones, respectively, said limiting case signal being a smallest system signal of a system set comprising a plurality of system signals, each of said system signals being associated with said release in a distinct zone of said plurality of zones, each system signal being a maximum one of said signals representing said effect in said one or more candidate zones from said release in said distinct zone of said plurality of zones for said each flow condition;

determine, for each candidate architecture, a robust limiting case signal based on a minimum of said each limiting case signal for said each flow condition; and select one of said plurality of candidate architectures as the siting architecture based on said robust limiting case signal of said each candidate architecture, identify the sites of said siting architecture as the sites for said one or more detectors in said facility.

20. The computer system of claim 19 wherein said one or more instructions select said candidate architecture associated with said robust limiting case signal having a highest value.

21. The computer system of claim 20 wherein said effect is a concentration of said contaminant, wherein said one or more instructions also:

scale said predetermined amount of contaminant released by a ratio of said robust limiting case signal having said highest value to a unit detection threshold of at least one of said detectors to provide a minimum concentration detected by said candidate architecture.

* * * * *